United States Patent
Roos (10) Patent No.: US 12,305,639 B2
(45) Date of Patent: May 20, 2025

(54) ELECTROMOTIVE OIL PUMP COMPRISING A NON-RETURN VALVE

(71) Applicant: Brose Fahrzeugteile SE & Co. Kommanditgesellschaft, Würzburg, Würzburg (DE)

(72) Inventor: Stephan Roos, Wertheim-Höhefeld (DE)

(73) Assignee: Brose Fahrzeugteile SE & Co. Kommanditgesellschaft, Würzburg (DE)

( * ) Notice: Subject to any disclaimer, the term of this patent is extended or adjusted under 35 U.S.C. 154(b) by 0 days.

(21) Appl. No.: 16/759,109

(22) PCT Filed: Oct. 23, 2018

(86) PCT No.: PCT/EP2018/078965
§ 371 (c)(1),
(2) Date: Apr. 24, 2020

(87) PCT Pub. No.: WO2019/081465
PCT Pub. Date: May 2, 2019

(65) Prior Publication Data
US 2020/0340462 A1    Oct. 29, 2020

(30) Foreign Application Priority Data
Oct. 24, 2017   (DE) ..................... 10 2017 219 004.3

(51) Int. Cl.
*F04C 15/06* (2006.01)
*F04C 2/10* (2006.01)
(Continued)

(52) U.S. Cl.
CPC ............ *F04C 15/066* (2013.01); *F04C 2/102* (2013.01); *F04C 15/008* (2013.01); *F16K 15/06* (2013.01)

(58) Field of Classification Search
CPC .......... F04C 2/08; F04C 2/102; F04C 15/008; F04C 15/06; F04C 15/064; F04C 15/066;
(Continued)

(56) References Cited

U.S. PATENT DOCUMENTS 1,901,217 A * 3/1933 Yerkes et al. ........... F16K 15/04
137/515
2,682,281 A * 6/1954 Ecker ...................... F16K 15/04
137/533.15
(Continued)

FOREIGN PATENT DOCUMENTS

DE    1203557 B    10/1965
DE    2001071 A1    7/1970
(Continued)

*Primary Examiner* — Kenneth J Hansen
*Assistant Examiner* — Chirag Jariwala
(74) *Attorney, Agent, or Firm* — Dickinson Wright PLLC (57) ABSTRACT

An electrical oil pump comprising a pump housing containing an electromotively driven pump rotor, and a discharge branch arranged on the housing side and receiving a non-return valve, said valve comprising a preferably spherical closing body arranged such that it can move between a valve seat and a supporting surface, and a closing body holder which is inserted into the discharge branch, forms the supporting surface and comprises through-flow sections, said holder being inserted into the discharge branch for captive holding therein.

8 Claims, 4 Drawing Sheets

(51) Int. Cl.
*F04C 15/00* (2006.01)
*F16K 15/06* (2006.01)

(58) Field of Classification Search
CPC ...... F16K 15/04; F16K 15/048; F16K 15/021;
F16K 15/00; F16K 15/02; F16K 15/06;
F16K 2250/50; F04B 15/02; F04B 17/03;
F04B 53/1002; F04B 53/101; F04B
53/1017; F04B 53/1085; F04B 53/18;
F04B 53/10; F04B 53/1007; F02M 59/02;
F02M 59/025; F02M 59/12; F16N 13/20;
F16N 2013/205; F16N 2280/00; Y10T
137/7914; Y10T 137/7937
USPC ......... 417/410.3, 410.4; 137/533.11, 533.13,
137/533.19, 528, 532, 533, 533.17,
137/533.15; 251/336, 338
See application file for complete search history.

(56) References Cited

U.S. PATENT DOCUMENTS

| | | | |
|---|---|---|---|
| 3,559,678 A * | 2/1971 | Donner | F16K 15/044 137/539.5 |
| 3,721,425 A * | 3/1973 | Jones | F16K 5/0678 251/174 |
| 4,466,461 A * | 8/1984 | Weiss | F16K 3/34 137/625.3 |
| 4,615,440 A * | 10/1986 | Downing | F01L 1/25 123/90.48 |
| 4,655,247 A | 4/1987 | Westra et al. | |
| 4,781,213 A | 11/1988 | Kilayko | |
| 4,945,947 A * | 8/1990 | Westra | F16K 15/04 137/519.5 |
| 6,685,451 B1 * | 2/2004 | Ivey | F04B 53/126 137/533.19 |
| 7,069,997 B2 * | 7/2006 | Coyes | F16K 15/04 166/325 |
| 2003/0127410 A1 | 7/2003 | Ito | |
| 2004/0013541 A1 * | 1/2004 | Sakakibara | H02K 7/14 417/410.3 |
| 2009/0223574 A1 | 9/2009 | Montague | |
| 2010/0269928 A1 * | 10/2010 | Ford | F16K 15/04 137/533.11 |
| 2016/0076539 A1 * | 3/2016 | Chikaoka | H02K 5/1732 417/410.4 |
| 2020/0063878 A1 * | 2/2020 | Leonov | E21B 34/06 |

FOREIGN PATENT DOCUMENTS

| | | | | |
|---|---|---|---|---|
| DE | 4016874 A1 | 11/1990 | | |
| DE | 69922191 T2 | 7/2005 | | |
| DE | 102005055360 A1 * | 5/2007 | ........... | F16K 15/026 |
| DE | 202016100946 U1 | 5/2016 | | |
| EP | 2302195 A1 | 3/2011 | | |
| WO | WO-2016051909 A1 * | 4/2016 | ............... | F16K 1/14 |

* cited by examiner

ELECTROMOTIVE OIL PUMP COMPRISING A NON-RETURN VALVE

CROSS-REFERENCE TO RELATED APPLICATIONS

This application is the U.S. National Phase of PCT/EP2018/078965 filed Oct. 23, 2018, which claims priority to DE 10 2017 219 004.3 filed Oct. 24, 2017, the disclosures of which are hereby incorporated in their entirety by reference herein.

TECHNICAL FIELD

The present disclosure relates to an electric or electromotively operated or driven oil pump.

BACKGROUND

An electric oil pump typically serves to convey oil as a lubricant for moving parts or components of the vehicle which is driven, for example, by an internal combustion engine, by hybrid technology or electrically. In such a hydraulic system, the oil pump generates an oil circuit as a result of its conveying properties and serves in particular to lubricate transmission parts of a vehicle transmission, in particular of an automatic transmission. The conveyed oil often also serves to cool components or add-on components of the drivetrain of such a vehicle.

Rotor or gear sets are often used as pump rotors of such oil pumps, to which end rotary vane or fly pumps also count as displacement pumps. A relatively low-cost and in this case comparatively pulsation-free pump type is an oil pump with what is known as a G-rotor (G-rotor pump). The pump rotor is in this case a rotor set (gear set) with an internally toothed outer rotor (outer gear ring) and with an externally toothed inner rotor (inner gear ring).

A check valve is often used to prevent a return flow of the conveyed medium or oil in such a hydraulic system in which a system pressure of up to 40 bar can be present. Otherwise, the electric motor would operate as a generator which can lead to damage or even destruction of the electronics (motor electronics) which control the electric motor.

SUMMARY

One or more objects of the present disclosure may be to provide a suitable electromotive oil pump with a check valve which works reliably and has a simple design. As an example, the check valve should also be possible to embody without a valve spring and be easy to mount.

The electromotive oil pump may have a pump housing with a discharge nozzle and a check valve received therein. A pump rotor driven by the electric motor is arranged in the pump housing. The pump rotor is appropriately embodied as what is known as a G-rotor (gerotor) and the oil pump thus as a G-rotor pump. To this end, the pump rotor is expediently embodied with two gearwheels, of which appropriately one gearwheel, namely an inner gearwheel (inner rotor) which is mounted eccentrically in the pump housing, is driven by means of the electric motor and is externally toothed is driven, which inner gearwheel is received by an internally toothed external gearwheel (outer rotor).

The check valve is provided and configured to provide on one hand in the opened state a sufficient flow cross-section for the conveyed medium (oil) so that the pressure difference between inflow and outflow side of the oil pump and thus the drop in pressure is as low (small) as possible and on the other hand in the closed state to reliably prevent the return flow of the medium (oil), i.e. to reliably seal off the discharge nozzle.

To this end, the check valve may have a closing or valve body received in the discharge nozzle, which closing or valve body may be embodied in the form of or as a ball (steel ball). The diameter of the valve body referred to below as a closing body is smaller than the inner diameter of the discharge nozzle or its inner circumferential wall. As a result of this, a sufficiently large throughflow cross-section is available for the conveyed medium (oil) in the region of the closing body. The closing body is arranged movably between a valve seat which surrounds a valve opening and a supporting surface in the longitudinal direction of the discharge nozzle (nozzle longitudinal direction). The nozzle longitudinal direction corresponds to the direction of flow of the medium flowing out via the discharge nozzle and conveyed by the oil pump.

The check valve furthermore may have a grid- or cage-like closing body holder. The closing body holder is inserted into the discharge nozzle once the closing body has been incorporated into the discharge nozzle. The closing body forms the supporting surface. In other words, the closing body holder provides the supporting surface or has it. The closing body holder is formed such that an adequate flow or throughflow cross-section is provided within the discharge nozzle. To this end, the closing body holder may have a number of throughflow portions around which and/or through which medium flows during operation of the oil pump. The closing body holder furthermore may have a joining contour which interacts directly or indirectly via a joining element with a corresponding joining contour of the discharge nozzle, i.e. its inner or circumferential wall while producing a secure retention of the closing body holder in the discharge nozzle.

In other words, the joining contours on the holder and nozzle side correspond such that a seat, which is as easy as possible to produce and is still reliable, of the closing body holder is produced in the discharge nozzle. For this purpose, a positive-locking connection in the nozzle longitudinal direction and thus in the direction of flow of the medium flowing out via the discharge nozzle may be produced between the closing body holder and the discharge nozzle so that a relative movement between the closing body holder and the discharge nozzle in the nozzle longitudinal direction is shut off as a result of the shape.

In one or more embodiments, the closing body holder may have a hollow-cylindrical wall with a number of wall portions which run in the longitudinal direction of the discharge nozzle and between which the throughflow portions are formed. The hollow-cylindrical wall of the closing body holder is thus expediently formed in a grid- or cage-like manner with struts running in the nozzle or holder longitudinal direction and may be equidistant in the circumferential direction as wall portions between which the throughflow portions are located as open, such as rectangular windows while providing the sufficient flow cross-section.

During operation of the oil pump, the closing body lifts off from the valve seat while releasing the valve opening and the medium flows via the valve opening and within the discharge nozzle past the closing body and via the throughflow portions in the hollow-cylindrical wall of the closing body holder out of the discharge nozzle. In order to further increase the size of the flow or throughflow cross-section, the discharge nozzle may have between its (nozzle-side)

joining contour and the valve seat a throughflow chamber in which the closing body holder is received spaced apart from the circumferential wall (inner wall) of the discharge nozzle therein while forming an annular gap. The annular gap is to be regarded in this case as circumference-side annular gap portions which are formed between the struts (wall portions) and the circumferentially closed inner wall of the also cylindrical discharge nozzle as a result of the grid- or cage-like structure of the closing body holder or its hollow-cylindrical wall.

The closing body holder is expediently a plastic part (plastic molded part) and appropriately may have at least one annular, and/or circumferentially closed wall portion. The wall portions (struts) running in the longitudinal direction of the discharge nozzle are formed thereon. As a result of this, on one hand, an overall sufficiently stable, as an example, sufficiently torsion-resistant construction of the closing body holder is ensured. On the other hand, the struts or strut-like (grid- or cage-like) wall portions are sufficiently elastically deformable in order to achieve the desired joining connection (positive-locking connection), such as by latching or clipping the closing body holder in the discharge nozzle.

The or one of these wall portions, may be circumferentially closed, can serve to provide the supporting surface for the closing body holder. This wall portion then forms an annular stop or bearing contour with the supporting surface for the closing body holder. Alternatively, the bearing contour is not formed as a ring portion which is circumferentially closed, but rather as a ring portion which is interrupted by the throughflow portions. This supporting surface or bearing contour embodied as an interrupted ring portion is appropriately formed along the hollow-cylindrical wall and, for example, in its central region as well as on the inside on the struts (wall portions) of the closing body holder. The bearing contour appropriately may have, depending on its arrangement and embodiment, throughflow regions which are on the inside of the ring and/or outside of the ring and which are aligned with the throughflow portions or form a transition into these.

The supporting surface is expediently formed as a centering surface for the closing body. In other words, the supporting surface is adapted to the surface of the closing body such that, during pump operation, it is centered on or in the cage- or grid-like closing body holder. As a result of this, the closing body is held on one hand securely on or in the closing body holder. On the other hand, vibrations of the closing body are avoided or at least reduced as a result. As a result of this, in turn, undesirable noises are advantageously avoided or at least reduced which can otherwise be caused by vibrations and/or as a result of a stopping of the closing body against the circumferential wall of the discharge nozzle. The cage- or grid-like closing body holder thus takes on, in addition to the holding function and to the centering function for the closing body, in practice also a damping function for damping (reducing) mechanical vibrations of the closing body.

A joining element in the form of a circlip is appropriately provided to produce the indirect joining or positive-locking connection. The corresponding joining contour of the discharge nozzle may be an annular groove incorporated into its (inside) circumferential wall, into which annular groove the circlip is inserted (placed) once the closing body and subsequently the closing body holder have been received in the discharge nozzle. The closing body holder is subsequently retracted and joined with the circlip, e.g. latched or clipped. The discharge nozzle is may be formed as one piece and the closing body is inserted from the opening or outflow side of the discharge nozzle into it, whereupon the closing body holder and the circlip are also inserted from this side into the discharge nozzle and the joining connection is produced.

In order to produce the direct joining or positive-locking connection, a latching projection formed on its outer circumference is appropriately provided as a (holder-side) joining contour of the closing body holder and an undercut edge incorporated in the circumferential wall of the discharge nozzle is provided as a corresponding (nozzle-side) joining contour of the discharge nozzle. In the case of this embodiment, the discharge nozzle is also advantageously embodied in one piece and the closing body is also inserted from the opening or outflow side of the discharge nozzle into it, whereupon the closing body holder is in turn inserted into the discharge nozzle and the joining connection is produced.

The pump housing may have a housing part which receives the pump rotor and a pump flange on which the discharge nozzle is provided. In the installation state of the oil pump, such as in a motor vehicle, the discharge nozzle may extend vertically. The check valve may be embodied without a valve spring i.e. in a valve spring-free manner and suitable as a ball check valve. In other words, the closing body may be arranged without a valve spring in the discharge nozzle between the valve seat and the supporting surface. As a result of a return flow of the medium, the closing body is pressed against the valve seat in the discharge nozzle. In the case of the vertical installation of the closing body, the closing body is pushed against the valve seat in the discharge nozzle in the case of the deenergized electric motor if the oil pump is not in operation solely as a result of its weight.

The embodiments described herein may provide simple mounting (simple mounting process) of the check valve as a result of the valve structure with only a few components, namely the closing body and the closing body holder as well as the one-piece embodiment of the discharge nozzle. A valve spring, an additional pipe nozzle, additional screws and a sealing element are not necessary here. As such, the discharge nozzle may be formed in one piece, high manufacturing precision and a narrow shape as well as small location and position tolerances are furthermore achieved. Moreover, due to the further possibility of using a metallic closing body, such as a steel ball, only the metallic components are pressure-loaded.

BRIEF DESCRIPTION OF THE DRAWINGS

Exemplary embodiments of the invention are explained below in greater detail on the basis of a drawing. In the drawing.

Corresponding parts are provided in all the figures with the same reference numbers.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
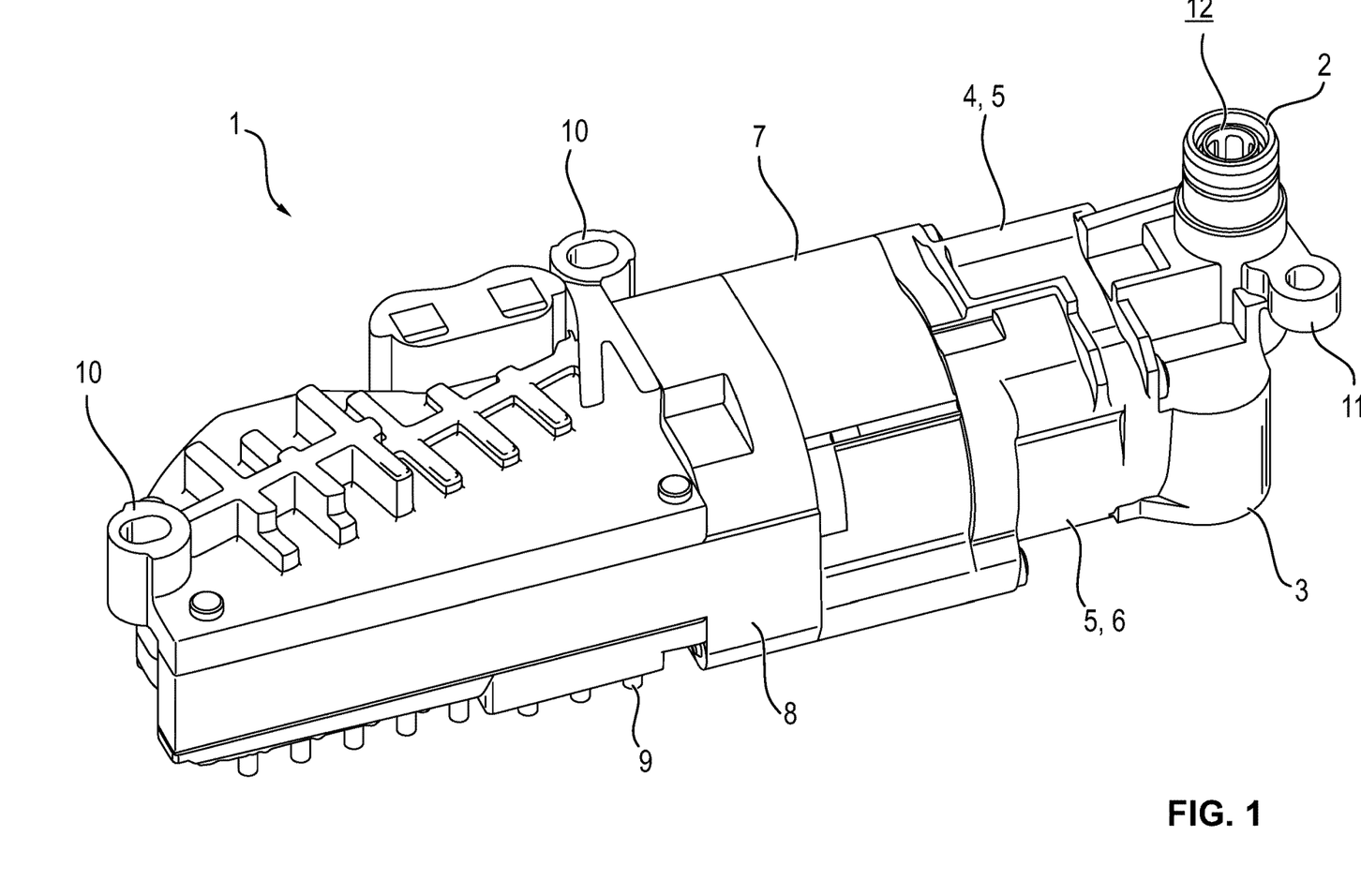
FIG. 1 shows, in perspective representation, an electromotive (electric) oil pump with a pump housing which is formed from a housing part for a pump rotor and a pump flange with a one-part discharge nozzle, and with a valve spring-free check valve in the discharge nozzle.

FIG. 1 shows electromotive oil pump 1 in its preferred installation position or orientation with vertically oriented, one-piece discharge nozzle 2. Oil pump 1 installed, for example, in a motor vehicle is integrated there into a hydraulic system in order, for example, in an oil circuit to convey the oil as medium or as lubricant for rotating parts, for example, transmission parts. The system pressure can be up to 40 bar. In other words, the pressure difference between an inflow side and an outflow side of oil pump 1 is correspondingly up to approximately 40 bar.

On the inflow side of oil pump 1, the medium flows via an intake nozzle 2 into oil pump 1 and escapes from it via discharge nozzle 2. Discharge nozzle 3 and intake nozzle 3 are integrated into a pump flange 4 of a pump housing 5. Pump flange 4 is mounted on a further housing part 6 of pump housing 5, for example, screw-fastened. A motor housing 7 of an electric motor is in turn placed on pump housing 5 and connected thereto, for example, also screwed. An electronic housing 8 adjoins motor housing 7, in which electronic housing 8 electronics (motor electronics) are accommodated. Electronic housing 8 has cooling bodies 9 for cooling power elements, for example, semiconductor switches, of the motor electronics. Connection tabs or flanges 10, 11 on electronic housing 8 or on pump housing 4 serve to fasten oil pump 1, for example, in the engine compartment of a motor vehicle.

Figure 2:
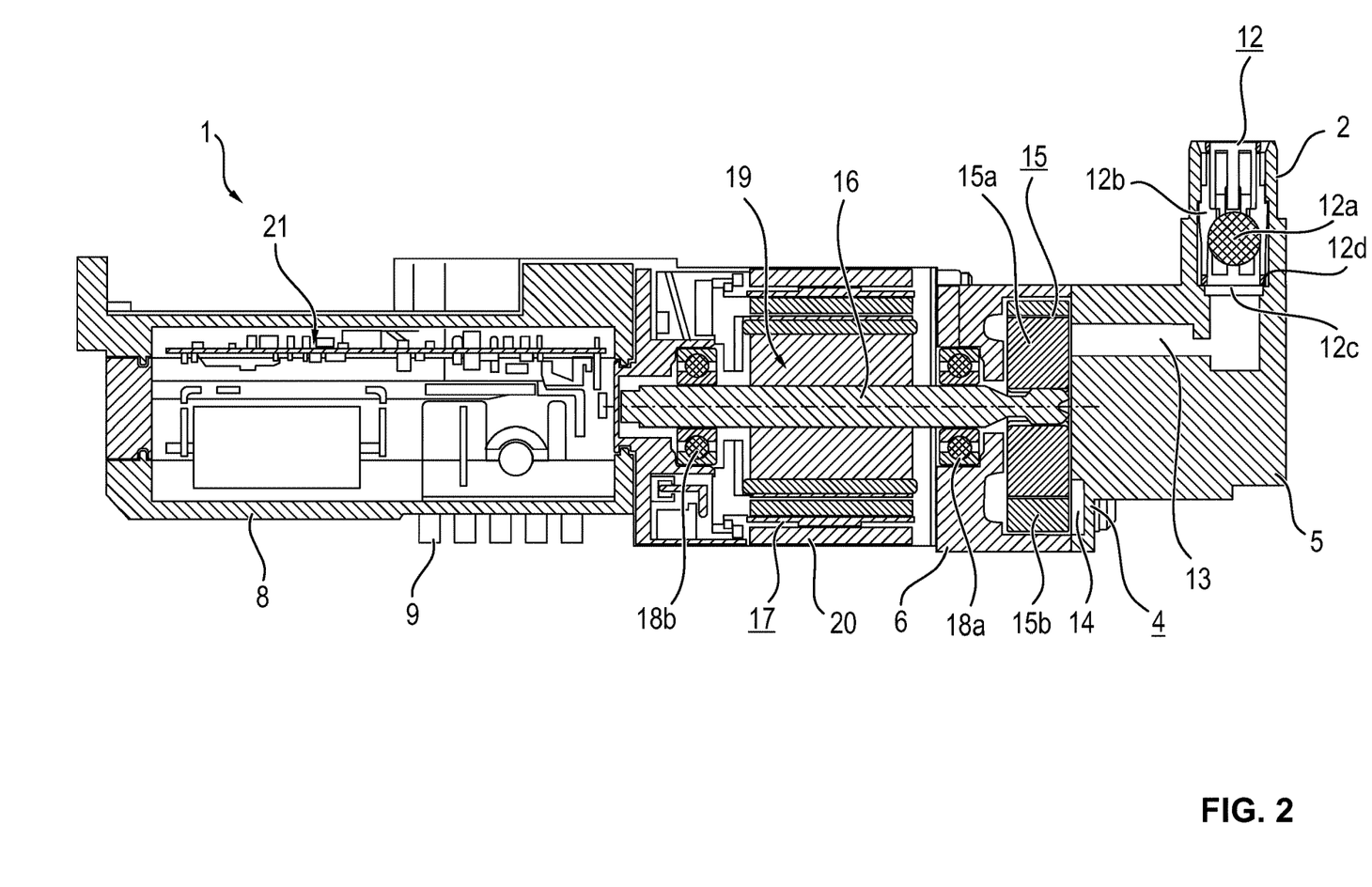
FIG. 2 shows the electromotive (electric) oil pump according to FIG. 1 in a sectional representation.

FIG. 2 shows oil pump 1 in a longitudinal section. It is comparatively clearly apparent that a valve spring-free check valve 12 with a valve or closing body 12a and a valve or closing body holder 12b is arranged in advantageously one-piece discharge nozzle 2 of pump flange 4. Closing body 12 may be embodied as a ball (steel ball) serves to close a valve opening 12c which is surrounded by a valve seat 12d. If oil pump 1 is not operated and such as when the electric motor is deenergized, closing body 12a is pushed against valve seat 12d as a result of its weight and closes valve opening 12c there.

Valve opening 12c is flow-connected via a flow channel 13 within pump flange 4 to a pump chamber 14 provided in housing part 6 of pump housing 5. What is known as a G-rotor (gerotor) is arranged as pump rotor 15 rotationally movably within pump chamber 14. Pump rotor 15 comprises an inner rotor 15a embodied as externally toothed internal gear and an outer rotor 15b embodied as an internally toothed external gear. Outer rotor 15b in which inner rotor 15a lies (sits) is centrally mounted. Inner rotor 15a is mounted eccentrically and coupled to motor shaft 16 of electric motor 17. Electric motor 17 is mounted on what is known as the A-side in a first bearing (ball bearing) 18a which is arranged in housing part 6 of pump housing 4. Motor shaft 16 is mounted within motor housing 7 in a further bearing (ball bearing) 18b on what is known as the B-side. Rotor 19 of electric motor 17 may be embodied as a rotor assembly (laminated core) with pocket magnets. Stator 20, surrounding rotor 19, of electric motor 17 is provided with appropriately connected coils while producing a stator or motor winding and may be overmolded with plastic. The appropriately three-phase motor winding is electrically connected to motor electronics 21 arranged in electronic housing 8 and is energized and actuated by the motor electronics 21.

The inflow side and the outflow side of oil pump 1 are thus connected via pump chamber 14 into which intake nozzle 3 discharges which is not apparent as a result of the sectional view selected in FIG. 2. Pump chamber 14 discharges via flow channel 13 and discharge nozzle 2 into the circuit joined thereto or the like. During operation of oil pump 1, electric motor 17 drives pump rotor 15 via its motor shaft 16, wherein the medium or oil is compressed and flows out of oil pump 1 with high pressure via the discharge nozzle.

Figure 3:
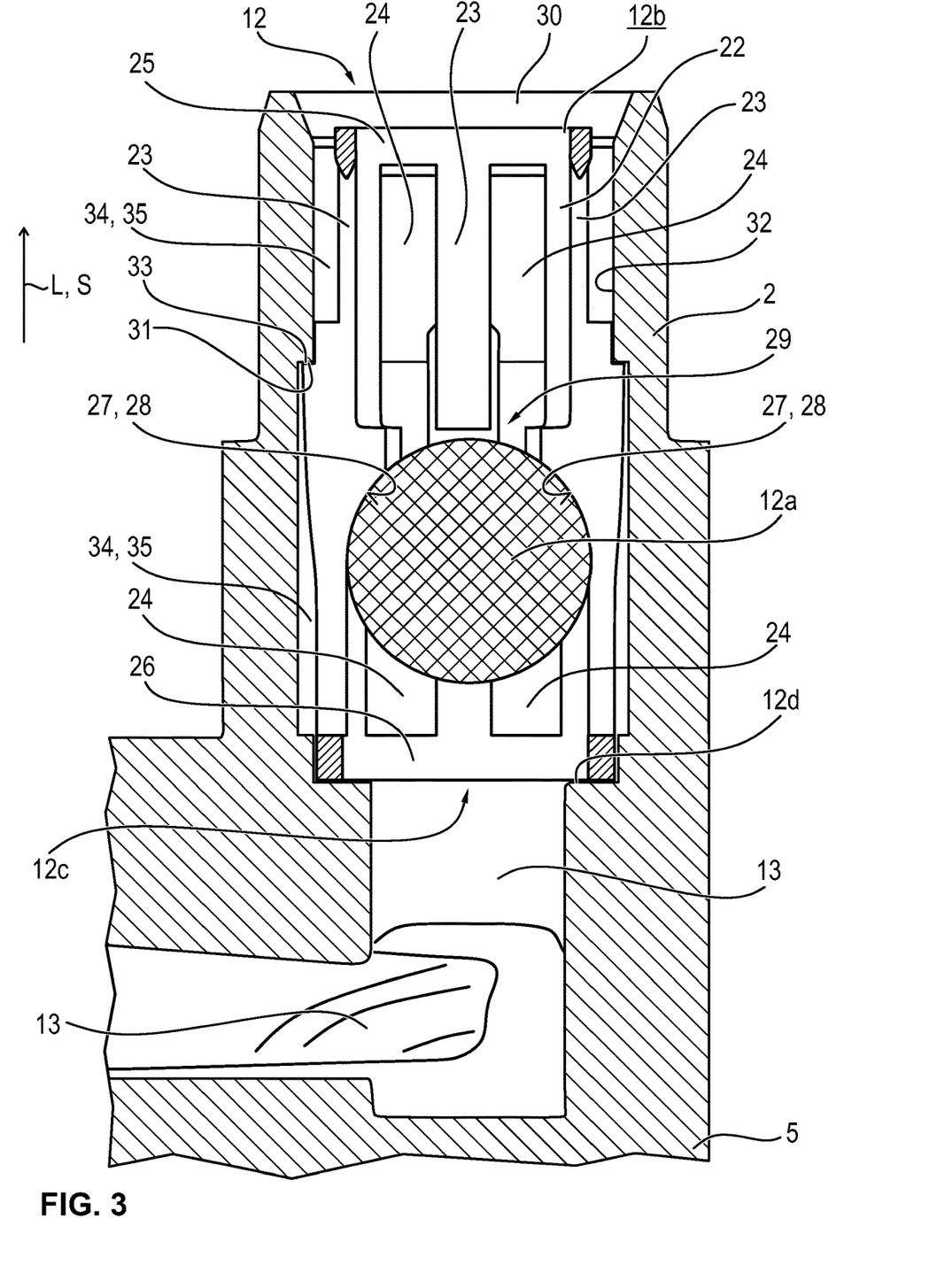
FIG. 3 shows, in a sectional representation, in sections on a large scale the pump flange with discharge nozzle and check valve received therein in the opened state, with a ball as a closing body and with a grid- or cage-like closing body holder which is latched for retaining the balls directly in the discharge nozzle.

FIG. 3 shows a preferred embodiment of check valve 12 embodied without a valve spring and with a closing body holder 12b. This may be formed as a plastic part and appropriately in the manner of a cage. To this end, closing body holder 12b has a hollow-cylindrical wall 22 with a number of web- or strut-like wall portions 23 running in longitudinal direction (nozzle longitudinal direction) L of discharge nozzle 2, between which wall portions 23 throughflow portions 24 are formed. Strut-like wall portions 23 are formed at both end sides on annular wall portions that may be circumferentially closed, namely an upper and lower wall portion 25 or 26 as seen in longitudinal direction L. Valve seat 12d is formed or provided in discharge nozzle 2 in the region of lower wall portion 26.

Closing body holder 12b has a supporting contour referred to below as supporting surface 27 against which closing body 12a may be embodied as a ball is pressed during operation of oil pump 1 as a result of the high pressure of the conveyed medium (oil pressure). In this position of closing body 12a, check valve 12 is opened in that its closing body 12a is lifted up from valve seat 12d and valve opening 12c is released.

Supporting surface 27 is formed on an annular stop or bearing contour 28 which is partially interrupted in the circumferential direction and which is formed on the inside (inner wall side) on strut-like wall portions 23 of closing body holder 12b. Interruptions 29 of bearing contour 28 form throughflow regions and are aligned with throughflow portions 24 of closing body holder 12d. As a result of this, it is achieved that the medium can flow, during operation of oil pump 1, without or with only a small degree of pressure loss past closing body 12a in direction of flow S, which corresponds to nozzle longitudinal direction L, out of discharge nozzle 2.

It is apparent that supporting surface 27 formed by bearing contour 28 is adapted to the surface of closing body 12a, i.e. may be embodied to have a spherical surface and is for this purpose formed as a ramp contour tapering toward outlet opening 30 of discharge nozzle 2. As a result of this, closing body 12a embodied as a ball is held centered in the represented position in the case of opened check valve 12 within closing body holder 12b and thus within discharge nozzle 2. Closing body 12a sits at least approximately in a vibration-free manner in closing body holder 12b during operation of oil pump 1 and is held securely in this position. As a result of this, noises are reliably damped during operation of oil pump 1.

Initially, closing body 12a is inserted into discharge nozzle 2 in the course of mounting check valve 12. Closing body holder 12b is subsequently inserted into discharge opening 2 and held securely therein. To this end, a positive-locking connection is appropriately produced as a joining connection between closing body holder 12b and discharge nozzle 2. The desired locking of a relative movement between closing body holder 12b and discharge nozzle 2 in nozzle longitudinal direction L which corresponds to direction of flow S of the conveyed medium is performed by corresponding, interacting joining or molding contours and is thus shape-related. To this end, closing body holder 12b has holder-side joining contours 31 in the form of latch-like cams or shoulders on the outside on its web-like wall portions. Discharge nozzle 2 has, for this purpose, on its inside surrounding wall 32 a corresponding joining or locking contour 33 as an undercut edge. For easy handling during mounting of check valve 12, strut-, cage- or grid-like wall portions 23 of closing body holder 12b are at least slightly elastically deformable transverse to the nozzle longitudinal direction.

Discharge nozzle 2 appropriately has between its joining contour (undercut edge) 33 for closing body holder 12b and valve seat 12d a throughflow chamber 34 into which closing body holder 12b is received with the formation of an annular gap 35 spaced apart from circumferential wall 32 of discharge nozzle 2 therein.

Figure 4:
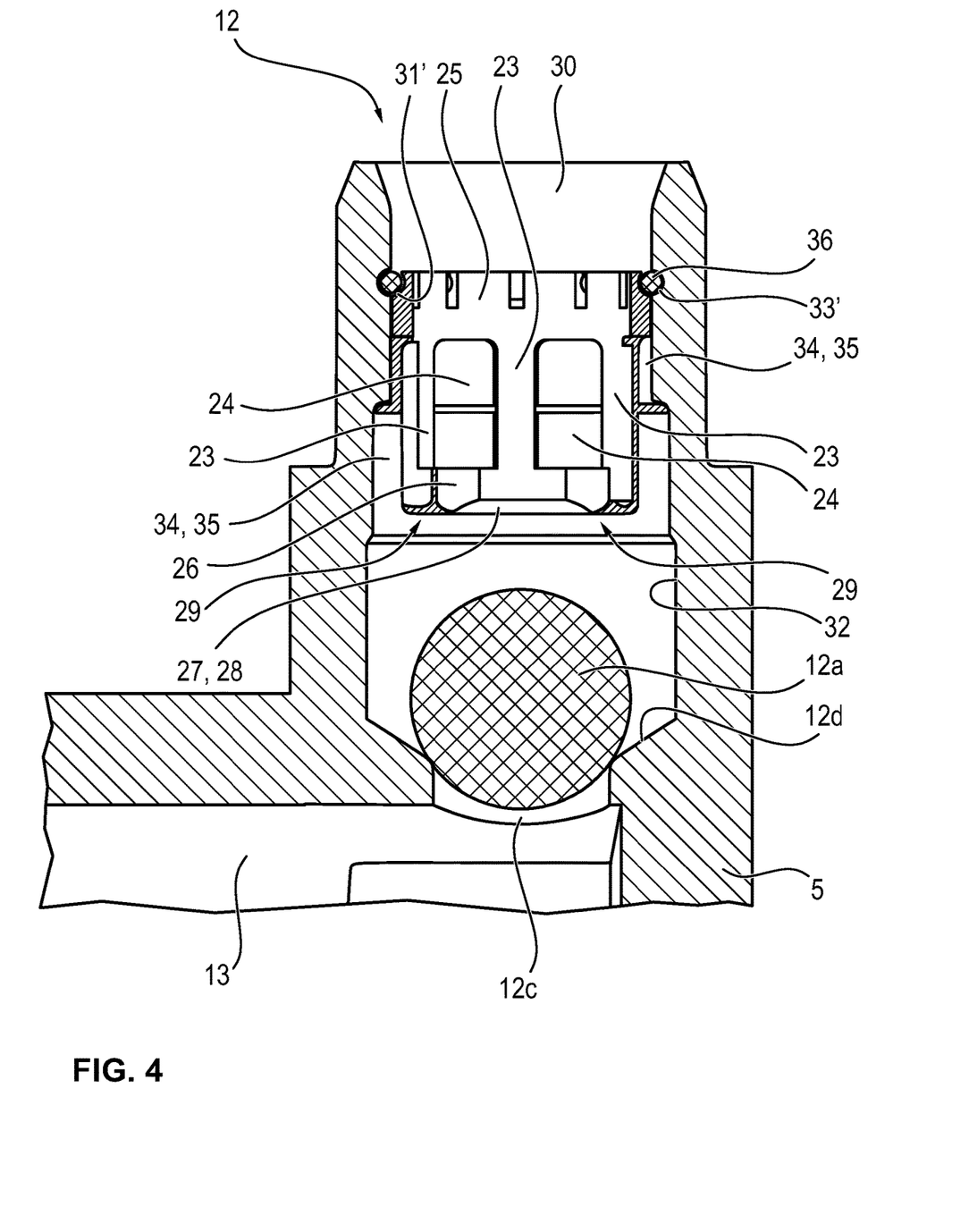
FIG. 4 shows, in a representation according to FIG. 3, an alternative embodiment of the check valve in the closed state, wherein its closing body holder for holding back the balls is clipped (latched) in the discharge nozzle indirectly by means of a circlip for retention of the ball.

While in the case of the embodiment according to FIG. 3 holder-side joining contour 31 of closing body holder which are formed from the cams or supporting shoulders formed on the outside on strut-like wall portions 23 interacts directly with nozzle-side joining contour 33 embodied as an undercut edge (undercut), in the case of the embodiment according to FIG. 4, an indirect interaction of a holder-side joining contour 31' with a corresponding nozzle-side joining contour 33' is produced. For this purpose, a joining element 36 in the form of a circlip is provided which is incorporated into nozzle-side joining contour 33' embodied as a circumferential annular groove in circumferential wall 32 of discharge nozzle 2. As a result of this, joining element 36 embodied as a circlip quasi forms the undercut for correspondingly formed, holder-side joining contour 31' of closing body holder 12b.

Closing body holder 12b according to the embodiment according to FIG. 4 is in turn embodied to be grid- or cage-like with strut-like wall portions 23 extending in nozzle longitudinal direction L, between which wall portions 23 throughflow portions 24 are formed. Strut-like wall portions 23 are also connected via an upper and lower wall portion 25 or 26 and for this purpose are formed thereon. Lower annular wall portion 26 serves in this case as stop or bearing contour 28 with supporting surface 27. In the case of this embodiment, supporting surface 27 or bearing contour 28 is, in contrast to the embodiment according to FIG. 3, not embodied to be partially interrupted on the inside of the ring, but rather partially interrupted on the outside of the ring and with throughflow regions (interruptions) 29 which are in turn aligned with window-like throughflow portions 24 of closing body holder 12b.

Both embodiments of closing body holder 12b according to FIGS. 3 and 4 provide an adequate flow cross-section for the conveyed medium (oil). While FIG. 3 shows closing body 12a embodied as a ball in the opened state of check valve 12, check valve 12 is represented in the closed state in FIG. 4. In this case, closing body 12a sits at valve seat 12d while sealing off valve opening 12c.

The invention is not restricted to the exemplary embodiments described above. On the contrary, other variants of the invention can also be derived therefrom by the person skilled in the art without departing from the subject matter of the invention. In particular, all of the individual features described in the context of the exemplary embodiments can furthermore also be combined with one another in a different manner without departing from the subject matter of the invention.

In summary, an electric oil pump 1 is described which has in a pump housing 5 an electromotively driven pump rotor 15 and a check valve 12 received in a housing-side discharge nozzle 2, which check valve 12 comprises a closing body 12a arranged movably in discharge nozzle 2 and a closing body holder 12b which has throughflow portions 24 and which is inserted into discharge nozzle 2 with closing body 12a received therein while producing secure retention.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMBERS

1 Oil pump
2 Intake nozzle
3 Discharge nozzle
4 Pump flange
5 Pump housing
6 Housing part
7 Motor housing
8 Electronic housing
9 Cooling body
10 Connection flange/tab
11 Connection flange/tab
12 Check valve
12a Valve/closing body (ball)
12b Valve/closing body holder
12c Valve opening
12d Valve seat
13 Flow channel
14 Pump chamber
15 Pump rotor/G-rotor
15a Inner rotor
15b Outer rotor
16 Motor shaft
17 Electric motor
18a A-side bearing
18b B-side bearing
19 Rotor
20 Stator
21 Motor electronics
22 Hollow-cylindrical wall
23 Strut/web-like wall portion
24 Throughflow portion
25 Upper annular wall portion
26 Lower annular wall portion
27 Supporting surface
28 Stop/bearing contour
29 Interruption/throughflow region
30 Outlet opening
31 Holder-side joining contour 32 Circumferential wall
33 Nozzle-side joining contour/undercut edge
33' Nozzle-side joining contour/annular groove
34 Throughflow chamber
35 Annular gap
36 Joining element/circlip
L Nozzle/longitudinal direction
S Direction of flow While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. An electromotive oil pump for a motor vehicle comprising:
    an electric motor;
    a pump housing defining a flow channel and including an intake nozzle and a discharge nozzle, the discharge nozzle defining a valve seat and configured to receive oil from the flow channel, at least a portion of the flow channel extends in a transverse direction and the discharge nozzle extending in a longitudinal direction, the longitudinal direction orthogonal to the transverse direction;
    a pump rotor driven by the electric motor and arranged in the pump housing; and
    a spring-free check valve including,
    a closing body holder disposed in the discharge nozzle with a first joining contour of the closing body holder directly interacting with a second joining contour defined by the discharge nozzle via a joining element to securely retain the closing body holder in the discharge nozzle, the closing body holder having a cage-like shape formed by a hollow-cylindrical wall provided with a number of wall portions extending in the longitudinal direction, the valve seat circumscribing a valve opening defined by the discharge nozzle, a semi-spherical supporting surface positioned opposite the valve seat, a number of throughflow portions formed between the number of wall portions, and a first annular gap formed between the number of wall portions and a circumferential wall of the discharge nozzle and disposed between the valve seat and the second joining contour, the first annular gap tapers with respect to the longitudinal direction,
    wherein the semi-spherical supporting surface is circumferentially discontinuous with the number of throughflow portions creating gaps in the semi-spherical supporting surface, and
    a spherical closing body disposed in the discharge nozzle arranged movably between the valve seat and the semi-spherical supporting surface, wherein the closing body is sized to nest with the semi-spherical supporting surface
    wherein a second annular gap is formed between the circumferential wall of the discharge nozzle and the number of wall portions, the second annular gap closer to an outlet opening of the discharge nozzle than the first annular gap, the second joining contour disposed between the first annular gap and the second annular gap.

2. The electromotive oil pump of claim 1, wherein the closing body holder includes at least one circumferentially closed annular wall portion that forms the number of wall portions.

3. The electromotive oil pump of claim 1, wherein the closing body holder includes annular bearing contour that forms the semi-spherical supporting surface and define throughflow regions aligned with the number of throughflow portions.

4. The electromotive oil pump of claim 1, wherein the joining element is a circlip at least partially disposed in an annular groove defined by the circumferential wall of the discharge nozzle.

5. The electromotive oil pump of claim 1, wherein an outer circumference the closing body holder includes a latching projection forming the first joining contour and the circumferential wall of the discharge nozzle defines an undercut edge forming the second joining contour.

6. The electromotive oil pump of claim 1, wherein the semi-spherical supporting surface of the closing body holder is formed as a centering surface configured to center the spherical closing body.

7. The electromotive oil pump of claim 1, wherein the pump housing includes a housing part that receives the pump rotor and a pump flange that forms the discharge nozzle.

8. The electromotive oil pump of claim 1, wherein the pump rotor is formed by a gear set provided with an inner rotor, mounted eccentrically in the pump housing, and an outer rotor, mounted centrally in the pump housing, that receives the inner rotor.

* * * * *